United States Patent
Johnson, Jr. et al.

(10) Patent No.: US 10,446,006 B1
(45) Date of Patent: Oct. 15, 2019

(54) PET ABANDONMENT ALERT DEVICE

(71) Applicants: David W. Johnson, Jr., Baltimore, MD (US); Sethia E. Scott, Baltimore, MD (US)

(72) Inventors: David W. Johnson, Jr., Baltimore, MD (US); Sethia E. Scott, Baltimore, MD (US)

( * ) Notice: Subject to any disclaimer, the term of this patent is extended or adjusted under 35 U.S.C. 154(b) by 32 days.

(21) Appl. No.: 14/860,886

(22) Filed: Sep. 22, 2015

Related U.S. Application Data

(60) Provisional application No. 62/053,417, filed on Sep. 22, 2014.

(51) Int. Cl.

| | |
|---|---|
| *G08B 21/02* | (2006.01) |
| *A01K 29/00* | (2006.01) |
| *G08B 25/00* | (2006.01) |
| *G08B 21/00* | (2006.01) |
| *A01K 15/02* | (2006.01) |
| *A01K 27/00* | (2006.01) |
| *A01K 11/00* | (2006.01) |
| *G08B 13/14* | (2006.01) |

(52) U.S. Cl.
CPC ........ *G08B 21/0261* (2013.01); *A01K 29/005* (2013.01); *G08B 21/02* (2013.01); *G08B 21/0205* (2013.01); *G08B 25/008* (2013.01); *A01K 11/008* (2013.01); *A01K 15/021* (2013.01); *A01K 27/001* (2013.01); *G08B 13/1427* (2013.01); *G08B 21/00* (2013.01)

(58) Field of Classification Search
CPC .. A01K 11/008; A01K 15/021; A01K 27/001; A01K 27/006; A01K 11/00; G08B 25/008; G08B 13/1427; G08B 21/00; G08B 21/0205; G08B 21/0216; G08B 21/0225; G08B 21/0233; G08B 21/0266; G08B 21/0211; G08B 21/02; G08B 21/0202; G08B 21/223
See application file for complete search history.

(56) References Cited

U.S. PATENT DOCUMENTS

| | | |
|---|---|---|
| 4,801,922 A | 1/1989 | Worrell et al. |
| 5,677,673 A | 10/1997 | Kipnis |
| 5,790,021 A | 8/1998 | Mickel et al. |
| 6,445,290 B1 | 9/2002 | Fingal et al. |
| 6,535,125 B2 | 3/2003 | Trivett |
| 6,573,832 B1 | 6/2003 | Fugere-Ramirez |
| 6,788,199 B2 * | 9/2004 | Crabtree ............ G01S 3/54 340/539.13 |
| 6,922,622 B2 | 7/2005 | Dulin et al. |
| 7,218,211 B2 | 5/2007 | Ho et al. |
| 7,576,645 B1 | 8/2009 | Lugerner et al. |
| 9,666,052 B1 * | 5/2017 | Smith ............ G08B 21/0205 |
| 2004/0051638 A1 | 3/2004 | Green |
| 2009/0224909 A1 * | 9/2009 | Derrick ............ G01S 5/0027 340/539.13 |

(Continued)

*Primary Examiner* — Benyam Haile
(74) *Attorney, Agent, or Firm* — Cramer Patent & Design, PLLC; Aaron R. Cramer

(57) ABSTRACT

A system utilizing transceivers and alarm sounders alerts an individual that a pet has been left in a vehicle when that individual is more than a certain distance away from the pet. A temperature sensor is provided with the transceiver located on the pet to further alert the individual if the temperature to which the pet is exposed rises above a certain level.

1 Claim, 5 Drawing Sheets

(56) References Cited

U.S. PATENT DOCUMENTS

| | | | |
|---|---|---|---|
| 2012/0223833 A1* | 9/2012 | Thomas | G06F 19/3418 340/539.12 |
| 2013/0181833 A1* | 7/2013 | Al-Ali | A61B 5/7455 340/539.12 |
| 2013/0285815 A1 | 10/2013 | Jones, II | |
| 2014/0266694 A1* | 9/2014 | McCluskey | G08B 21/0453 340/539.12 |
| 2014/0298859 A1* | 10/2014 | Balboni | G01K 13/002 63/1.13 |
| 2016/0021506 A1* | 1/2016 | Bonge, Jr. | A01K 27/009 717/173 |
| 2016/0063835 A1* | 3/2016 | Lyles | H04R 3/00 340/573.1 |

\* cited by examiner

PET ABANDONMENT ALERT DEVICE

RELATED APPLICATIONS

The present invention is a continuation of, was first described in, and claims the benefit of U.S. Provisional Application No. 62/053,417, filed Sep. 22, 2014, the entire disclosures of which are incorporated herein by reference.

FIELD OF THE INVENTION

The present invention relates generally to a system utilizing transceivers and alarm sounders to alert an individual that a pet has been left in a vehicle when that individual is more than a certain distance away from the pet.

BACKGROUND OF THE INVENTION

It is all too often that we learn of a tragedy involving death or serious injury that results from pets such as dogs being locked inside of an automobile on a hot day.

Whether the act is accidental, intentional, unintentional, or just neglectful, the dangers are very real, and often result in death for the trapped occupant. Even on somewhat cool days, the most responsible of owners have been known to run into a store for just a few minutes, and then run into delays thereby risking injury or death to his or her pet. This is because temperatures can quickly rise inside a vehicle when exposed to direct sunlight.

Accordingly, there is a need for a means by which trapped or abandoned vehicle occupants such as a pet can be rescued before injury or death occurs. The use of the alert device prevents pet deaths from accidental or unintended confinement in a hot motor vehicle in a manner that is easy, effective, and quick.

SUMMARY OF THE INVENTION

The inventor has recognized the aforementioned lack in the art and observed that there is a need for a pet abandonment alert device.

It is therefore an object of the invention to provide an alert system which comprises a transmitter assembly. The transmitter assembly comprises a transmitter housing; a transmitter power source, a transmitter microprocessor in electrical communication with the transmitter power source, a transmitter power switch in electrical communication between the transmitter power source and the transmitter microprocessor, a transmitter in electrical communication with the transmitter microprocessor, a temperature sensor in electrical communication with the transmitter microprocessor, a signal emitter in electrical communication with the transmitter microprocessor, a plurality of light sources located on the transmitter housing and in electrical communication with the transmitter microprocessor, a temperature set point increment switch located on the transmitter housing and in electrical communication with the transmitter microprocessor, a temperature set point decrement switch located on the transmitter housing and in electrical communication with the transmitter microprocessor, a transmitter alarm speaker located on the transmitter housing and in electrical communication with the transmitter microprocessor, a transmitter volume control located on the transmitter housing and in electrical communication between the transmitter alarm speaker and the transmitter microprocessor, and a transmitter reset switch located on the transmitter housing and in electrical communication between the transmitter alarm speaker and the transmitter microprocessor.

The alert system also comprises a receiver assembly. The receiver assembly comprises either a bracelet or key fob housing; a receiver power source, a receiver microprocessor in electrical communication with the receiver power source, a receiver power switch in electrical communication between the receiver power source and the receiver microprocessor, a receiver secured within the bracelet housing, in electrical communication with the receiver microprocessor and in wireless communication with the transmitter via radio waves or a carrier signal, a display screen located on the receiver housing and in electrical communication with the receiver microprocessor, a distance increase switch located on the receiver housing and in electrical communication with the receiver microprocessor, a distance decrease switch located on the receiver housing and in electrical communication with the receiver microprocessor, and a receiver alarm speaker located on the receiver housing and in electrical communication with the receiver microprocessor.

Temperature data is collected by the temperature sensor and electrically communicated to the transmitter microprocessor. The transmitter microprocessor communicates the temperature data to the signal emitter. Then the signal emitter wirelessly communicates the temperature data to the receiver. Next, the receiver microprocessor obtains a current distance between the receiver and the transmitter. The alarm speaker and the plurality of light sources are each then activated when the current distance equals the desired distance. The alarm speaker and plurality of light sources are each also then activated when the temperature data equals the desired temperature.

A desired temperature is selectively programmed via a user interface with the temperature set point increment switch or the temperature set point decrement switch. Additionally, a desired distance is selectively programmed via a user interface with the distance increase switch or the distance decrease switch. The display screen displays the desired temperature, the temperature data, the current distance and the desired distance.

The transmitter housing may also comprise a transmitter attachment means for removably attaching the transmitter assembly to a collar. The bracelet housing may also comprise a receiver attachment means for removably attaching the receiver assembly to a wrist strap. The light sources may be arranged in an array. The display screen may display the temperature as a graph.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
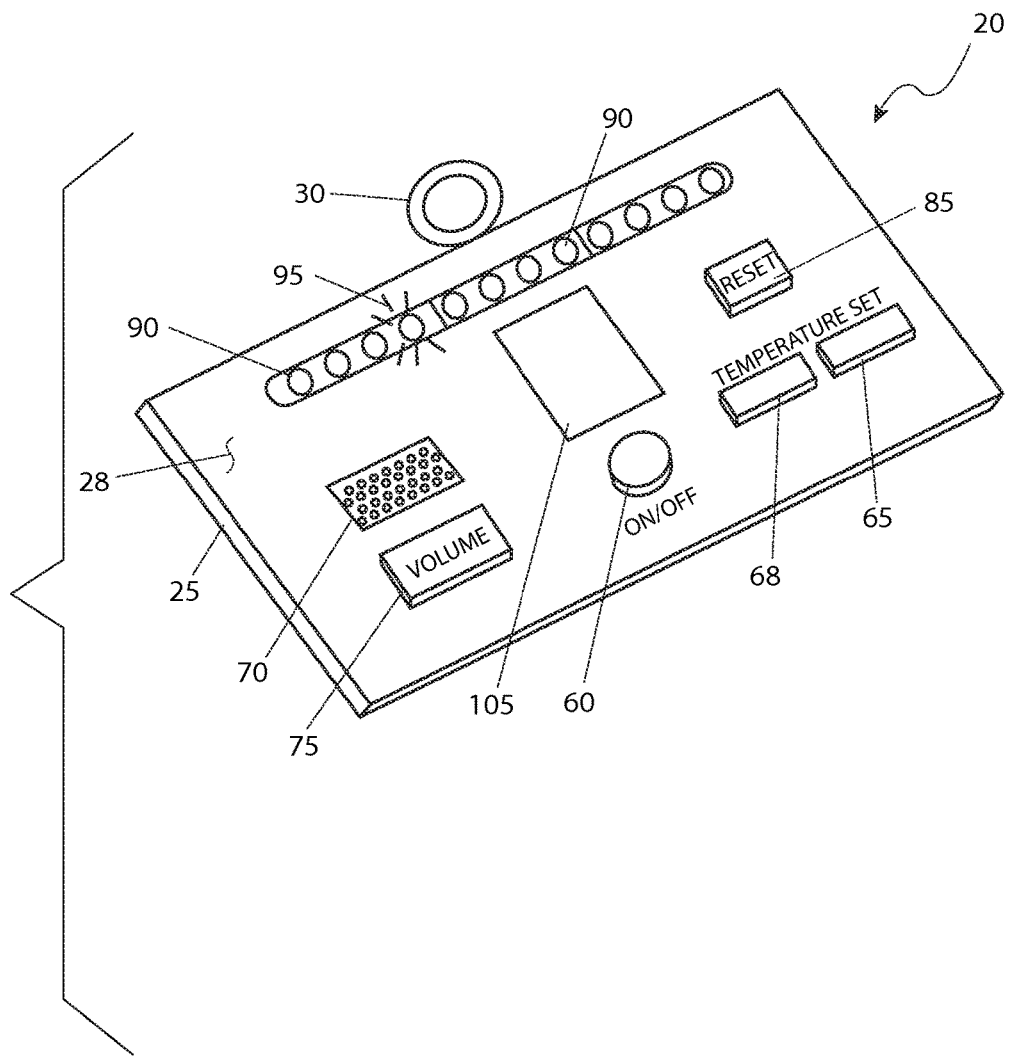
FIG. 1 is an isometric view of a transmitter 20 of a pet abandonment alert system 10 in accordance with the preferred embodiment of the present invention.

DESCRIPTIVE KEY 10 pet abandonment alert system
20 transmitter
25 transmitter housing
28 front face
30 suspension ring
35 transmitter battery compartment
40 transmitter power source
45 transmitter electronic circuitry
50 transmitter microprocessor
55 electrical wiring
60 transmitter power switch
65 temperature set point increment switch
68 temperature set point decrement switch
70 transmitter alarm
75 transmitter alarm volume control
80 temperature sensor
85 reset switch
90 light source
95 illumination
100 signal emitter
105 transmitter display
110 bracelet receiver
115 bracelet receiver housing
118 bracelet receiver face
120 wrist strap
125 receiver battery compartment
130 receiver power source
135 receiver power switch
140 signal receiver
145 receiver electronic circuitry
150 receiver microprocessor
155 receiver alarm
160 display screen
162 distance increase switch
163 distance decrease switch
165 communication signal
168 temperature increase switch
169 temperature decrease switch
170 range alarm
180 key fob receiver
185 key fob receiver housing
200 pet
205 motor vehicle
210 user
215 distance "d"

DETAILED DESCRIPTION OF THE PREFERRED EMBODIMENT

The best mode for carrying out the invention is presented in terms of its preferred embodiment, herein depicted within FIGS. 1, 2 and 4a through 4b. FIGS. 3 and 4c depict an alternate embodiment. FIG. 5 depicts the device in a utilized state. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a pet abandonment alert system (herein referred to as the "system") 10, which provides a means to notify a wearer, with an audible alarm from a bracelet receiver 110 in one (1) embodiment and a key fob receiver 180 in another embodiment, if a pet, in possession of a transmitter 20, becomes separated from the wearer by more than a pre-set distance. The transmitter 20 is additionally provided with a temperature sensor 80. Data from the temperature sensor 80 can be transmitted to either the bracelet receiver 110 or key fob receiver 180 and shown on a display screen 160.

Figure 4C:
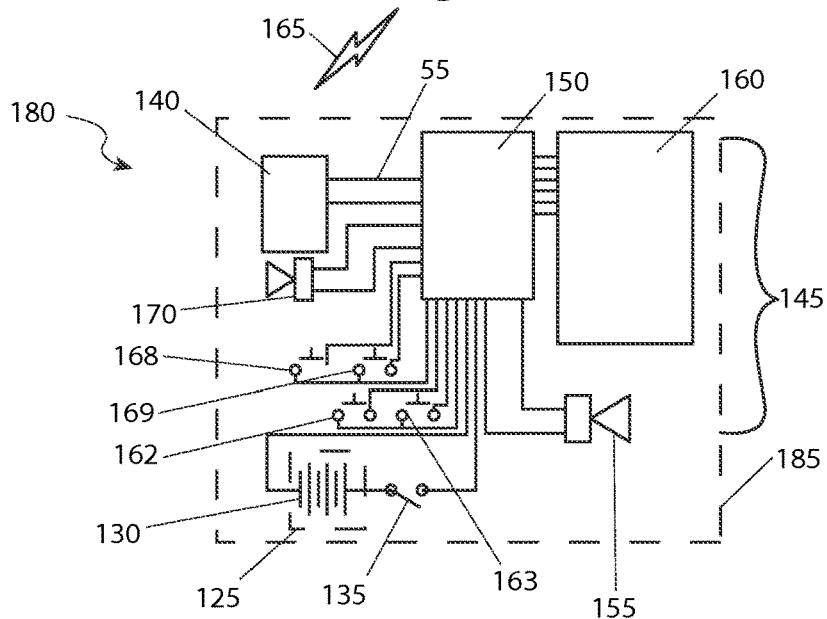
FIG. 4c is an electrical block diagram of the key fob receiver 180 of the pet abandonment alert system 10 in accordance with the alternate embodiment of the present invention; and, FIG. 5 is a perspective diagram of the pet abandonment alert system 10 shown in a utilized state in accordance with the preferred embodiment of the present invention.
Figure 4A:
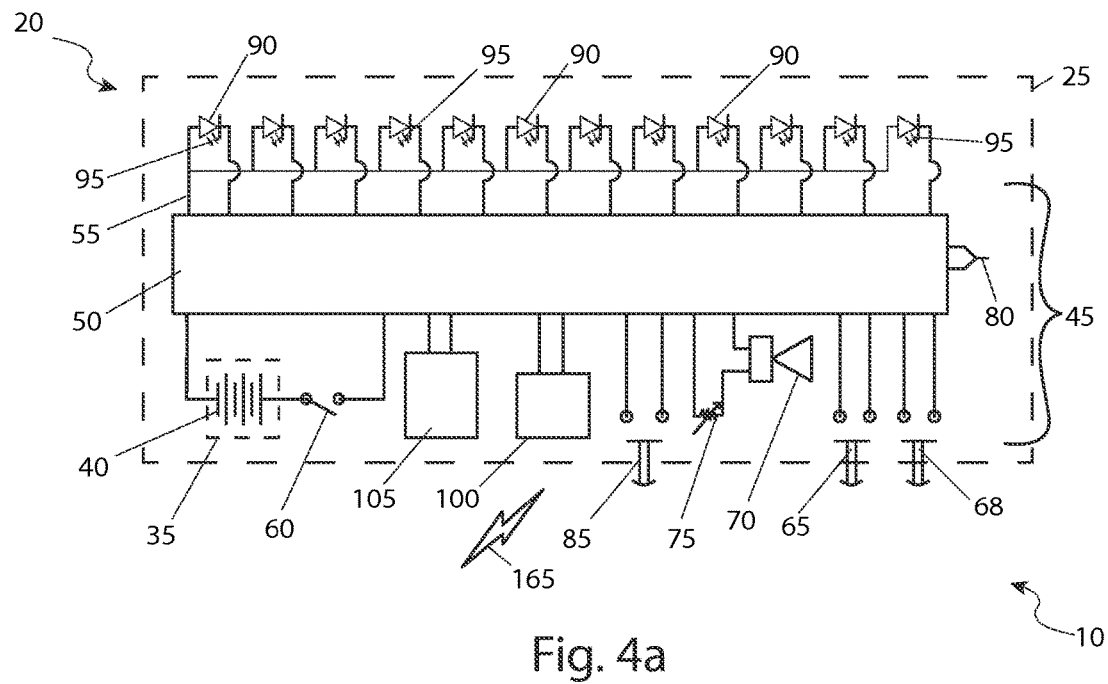
FIG. 4a is an electrical block diagram of the transmitter 20 of the pet abandonment alert system 10 in accordance with the preferred embodiment of the present invention.
Figure 5:
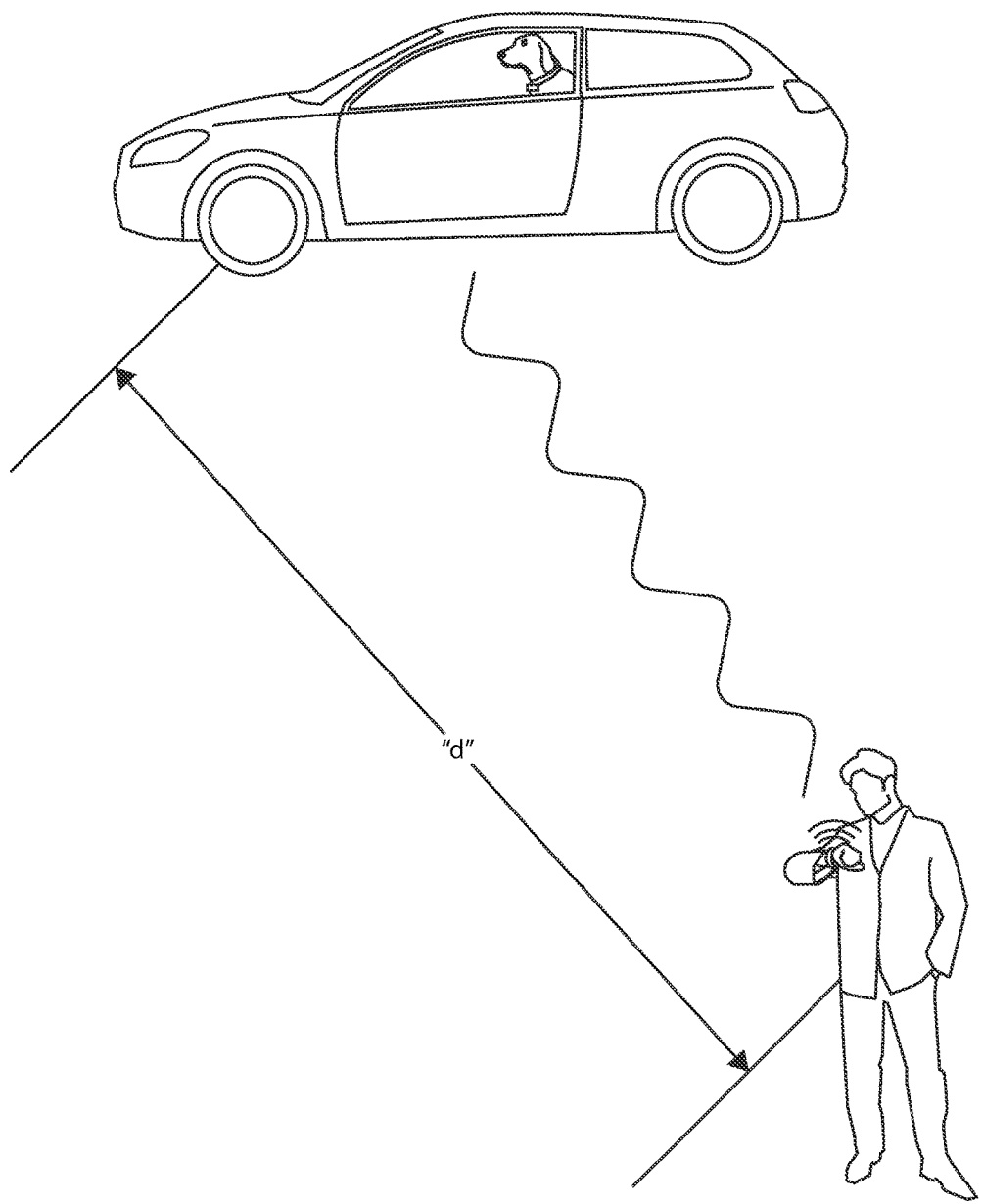

Referring now to FIG. 1, an isometric view of the transmitter 20, and FIG. 4a, an electrical block diagram of the transmitter 20 of the system 10, according to the preferred embodiment of the present invention, are disclosed. The system 10 alerts an owner to a pet that is separated by some distance, as the system 10 cannot be made to differentiate the interior of a motor vehicle from any other enclosure. The system 10 comprises a transmitter 20 attached in some fashion to the pet, and a bracelet receiver 110 preferably worn on the wrist of the owner having a display screen 160 and a receiver alarm 155. Alternately, a key fob receiver 180 with the same general functionality of the bracelet receiver 110, may be utilized. The transmitter 20 includes a transmitter housing 25 constructed of a thermoplastic material and formed from a plurality of injection-molded parts to contain a transmitter power source 40 within a transmitter battery compartment 35. The transmitter housing 25 may be provided with a suspension ring 30 as a means to affix the transmitter 20 to the pet in some manner.

The transmitter power source 40 may be a battery of any current technology, or another device, such as a capacitor, capable of holding an electrical charge and supplying that charge as an electromotive force to the transmitter electronic circuitry 45 in order to accomplish the proper function thereof. Electrical wiring 55 is provided for power conduction between the transmitter power source 40 and the transmitter electronic circuitry 45. The transmitter electronic circuitry 45 is in communication with the transmitter power source 40 via a transmitter power switch 60. The transmitter power switch 60 is preferably a push-button switch mounted on a front face 28. It should be understood that other types of transmitter power switches 60, such as toggle switches, or two-position slide switches, may be utilized without limiting the scope of the system 10.

The transmitter 20 is provided with a temperature sensor 80 that monitors the temperature of the ambient air surrounding the pet as well as, preferably, a radio signal emitter 100. The temperature sensor 80 is preferably configured to be a commercially available thermocouple having dissimilar constituent elements capable of a linear response to the existing thermal conditions of the environment in the vicinity of the transmitter 20. The temperature data is collected by the transmitter microprocessor 50 from the temperature sensor 80 and directed to the signal emitter 100. The signal emitter 100 delivers the temperature data to either the bracelet receiver 110 or key fob receiver 180 via a communication signal 165. In an alternate embodiment the temperature data may be transmitted on a carrier wave. It is envisioned that the transmitter 20 will be provided with some type of transmitter display 105 capable of showing the ambient temperature. Other embodiments provide for both the ambient temperature and the pre-set temperature to be displayed. The transmitter 20 will additionally be provided with a plurality of light sources 90 arranged in an array, preferably on the front face 28. The light sources 90 are each preferably configured to be a light-emitting diode (LED) capable of emitting illumination 95 when activated by the transmitter microprocessor 50. Each individual light source 90 would correspond to a finite range of temperatures and if the ambient temperature were to increase, the light sources 90 would be activated sequentially as an indication thereof. The light sources 90 may be grouped according to the wavelength of the illumination 95 emitted so as to afford a viewer the sense of impending distress.

The transmitter 20 will be provided with a temperature set point increment switch 65 and a temperature set point decrement switch 68, preferably located on the front face 28, to adjust the temperature at which a transmitter alarm 70 will be activated. The temperature set point increment switch 65 and the temperature set point decrement switch 68 are preferably configured to be push-button switches capable of interfacing with the transmitter microprocessor 50 in such a manner as to accomplish the intended function. Upon activation of the transmitter alarm 70, the signal emitter 100 will notify the bracelet receiver 110 or key fob receiver 180, via a communication signal 165, of the alarm condition and cause a receiver alarm 155 within the bracelet receiver 110 or key fob receiver 180 to be activated. The transmitter alarm 70 is provided with a transmitter alarm volume control 75 capable of muting the transmitter alarm 70. The transmitter electronic circuitry 45 is equipped with a reset switch 85 which will shut off both the transmitter alarm 70 and the receiver temperature alarm 155. The reset switch 85 is configured to be a push-button switch disposed on the front face 28 of the transmitter 20.

Figure 2:
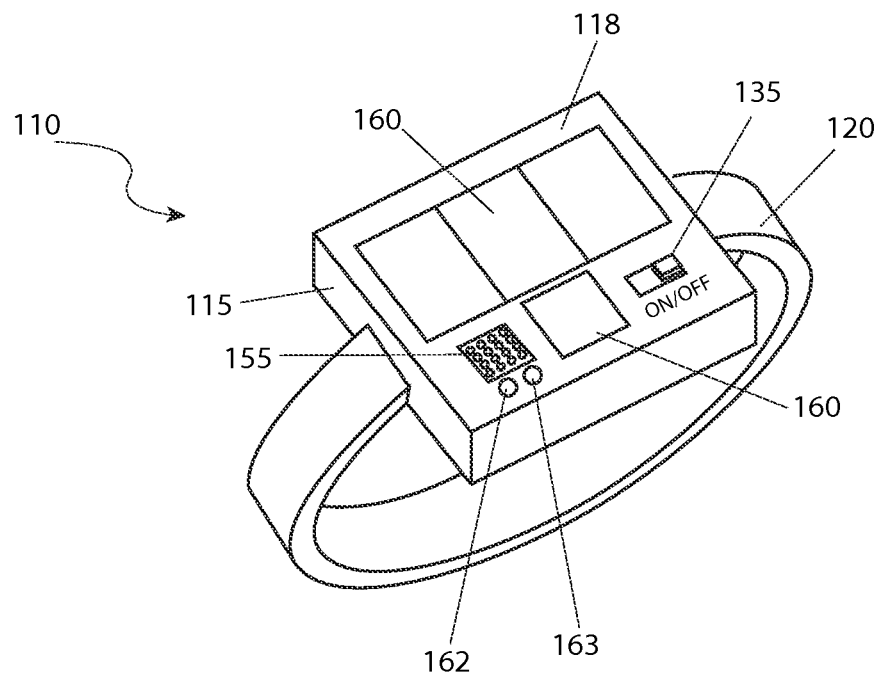
FIG. 2 is an isometric view of a bracelet receiver 110 of the pet abandonment alert system 10 in accordance with the preferred embodiment of the present invention.
Figure 3:
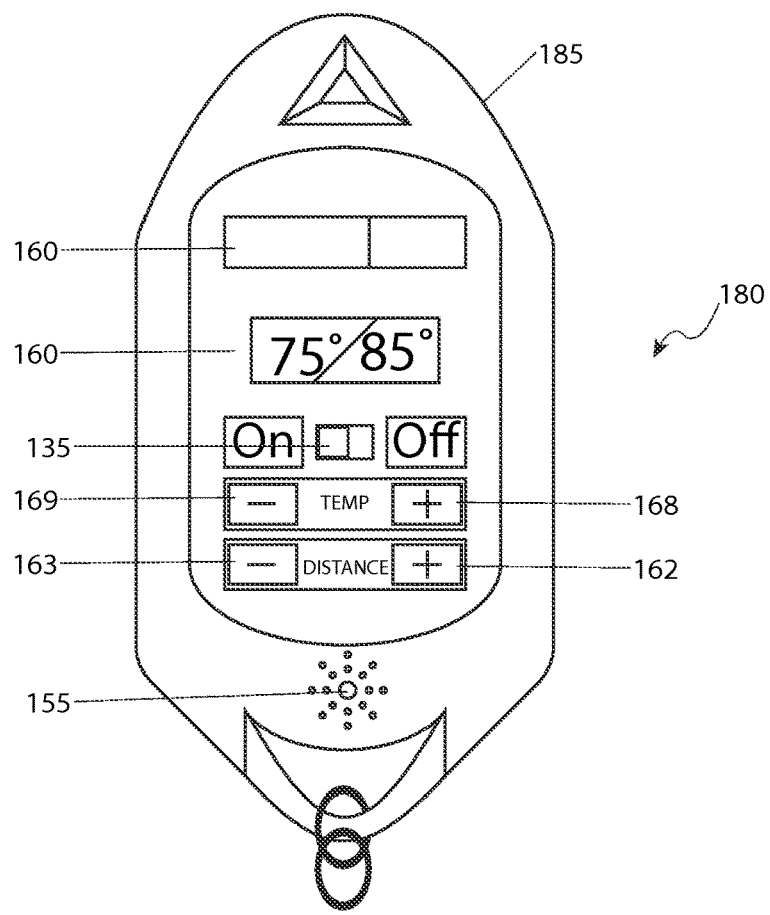
FIG. 3 is a front view of a key fob receiver 180 of the pet abandonment alert system 10 in accordance with an alternate embodiment of the present invention.
Figure 4B:
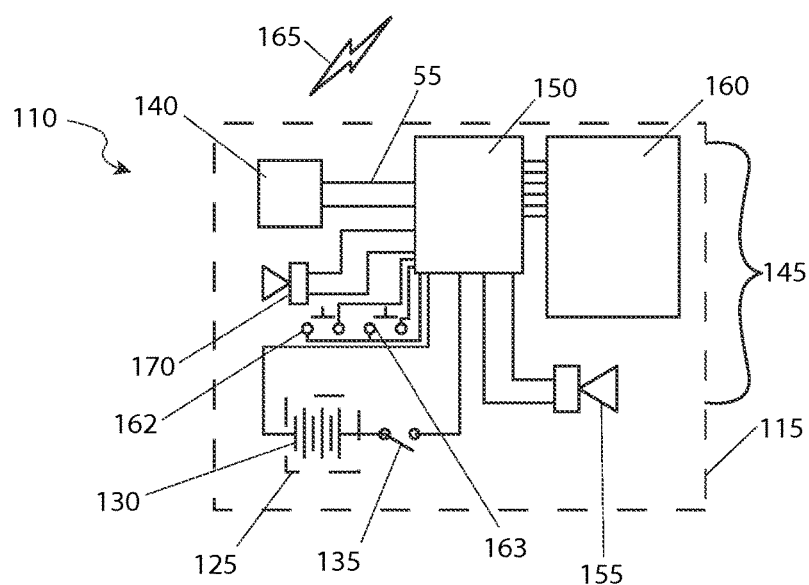
FIG. 4b is an electrical block diagram of the bracelet receiver 110 of the pet abandonment alert system 10 in accordance with the preferred embodiment of the present invention.

Referring now to FIG. 2, an isometric view of the bracelet receiver 110, FIG. 4b, an electrical block diagram of the bracelet receiver 110 of the system 10, FIG. 3, a front view of the key fob receiver 180, and FIG. 4c, an electrical block diagram of the key fob receiver 180 of the system 10, are disclosed. The bracelet receiver 110 includes a receiver housing 115 constructed of a thermoplastic material and formed from a plurality of injection-molded parts to contain a receiver power source 130 within a receiver battery compartment 125. Similarly, the key fob receiver 180 includes a key fob receiver housing 185. The bracelet receiver housing 115 is preferably configured to be mounted on a wrist strap 120 as a means to affix the receiver 110 to the owner. In a preferred embodiment, the wrist strap 120 is configured to be an expandable, segmented band connected at both sides of the bracelet receiver housing 115 and flexibly encircling the owner's wrist. It is understood that other configurations for the wrist strap 120, such as a two-piece strap comprised of leather, or a textile, hand having a buckle, may be utilized without limiting the scope of the system 10. The key fob receiver housing 185 is preferably capable of attaching to a key ring.

The receiver power source 130 may be a battery of any current technology, or another device, such as a capacitor, capable of holding an electrical charge and supplying that charge as an electromotive force to the receiver electronic circuitry 145 in order to accomplish the proper function thereof. Electrical wiring 55 is provided for power conduction between the receiver power source 130 and the receiver electronic circuitry 145. The receiver electronic circuitry 145 is in communication with the receiver power source 130 via a receiver power switch 135. The receiver power switch 135 is preferably a two-position slide switch mounted on a receiver face 118 in the case of the bracelet receiver 110 and on the key fob receiver housing 185 in the case of the key fob receiver 180. It should be understood that other types of receiver power switches 135, such as toggle switches, or push-button switches, may be utilized without limiting the scope of the system 10.

The bracelet receiver 110 and key fob receiver 180 are each equipped with a receiver microprocessor 150 capable of analyzing the communication signals 165 from the transmitter 20 and determining the distance through which the communication signal 165 is being transmitted. A range alarm 170 is provided to alert the wearer that the distance from the pet has exceeded a pre-set threshold programmed into the receiver microprocessor 150. A distance increase switch 162 and a distance decrease switch 163 that allows the user to adjust the safe distance the pet can be away from either the bracelet receiver 110 or key fob receiver 180. This distance is envisioned to vary throughout the time of the day, urban or rural environments, type of pet, activity of the pet, age of the pet, and other factors. Due to the variability of this parameter, the positioning of the distance increase switch 162 and the distance decrease switch 163 upon the bracelet receiver 110 and key fob receiver 180 allow for easy adjustment. The current controlled distance is displayed upon a display screen 160 and is envisioned to be configurable in meters or feet. Further, the key fob receiver 180 also is equipped with a temperature increase switch 168 and a temperature decrease switch 169 in order to adjust the pre-set temperature to adjust the temperature at which a transmitter alarm 70 will be activated, similar to the temperature set point increment switch 65 and the temperature set point decrement switch 68 of the transmitter 20.

The ambient temperature around the pet can be shown on the display screen 160. In a preferred embodiment, the temperature is displayed as a graph extending through a plurality of zones represented by various colors being equivalent to ranges of perceived discomfort as well as displaying the present ambient temperature at the pet. When the ambient air temperature around the pet exceeds the pre-programmed limit, as determined by the transmitter microprocessor 50 based upon the temperature set point programmed by the owner, the receiver temperature alarm 155 on the bracelet receiver housing 115 or key fob receiver housing 185 will also sound. The receiver temperature alarm 155 will continue to emit sound until the air temperature is lowered, or the transmitter 20 is moved to a lower temperature environment and the system 10 is reset as the receiver temperature alarm 15 is configured to be immutable from the bracelet receiver 110 or key fob receiver 180 alone.

Referring finally to FIG. 5, a perspective diagram of the pet abandonment alert system 10 shown in a utilized state in accordance with the preferred bracelet receiver 110 embodiment of the present invention is depicted. It is appreciated that the key fob receiver 180 would be utilized in a similar way, being attached to a key chain commonly carrier by a user 210. In an operational scenario envisioned, a pet 200 such as a dog, is confined in a motor vehicle 205. A user 210 is positioned at a distance "d" 215 away from the vehicle unknowingly aware that he or she has left the pet 200 behind. At the preprogrammed distance "d" 215 the bracelet receiver 110 will activate the range alarm 170 (as shown in FIGS. 2 and 3b) as provided upon varying parameters of the communication signal 165 as produced by the transmitter 20 worn by the pet 200. As aforementioned described, the bracelet receiver, 110, the transmitter 20 and the communication signal 165 also continuously receive, broadcast, and transmit the ambient temperature respectively in the area of the pet 200. A high temperature alarm is then generated at the bracelet receiver 110 regardless of the distance "d". The user 210 must return to the pet 200 under such an alarm immediately for the safe rescue of the pet 200 in order to silence the alarm. The distance "d" 215 is adjustable via programming of the distance increase switch 162 and the distance decrease switch 163 (as shown in FIGS. 2 and 3b). Suitable distance "d" 215 values are envisioned to be twenty-five feet (25 ft.) such as while walking a dog, fifty feet (50 ft.) while in a home, or two hundred fifty feet (250 ft.) while the dog is outdoors (such as in a dog walk area).

In accordance with the invention, the illustrated embodiment can be utilized by an enabled individual in a simple and straightforward manner with little or no training. The method of installing and utilizing the system 10 may be achieved by performing the following steps: acquiring a model of the system 10 of either the bracelet receiver 110 or key fob receiver 180 to suit the taste of a user; installing the appropriate transmitter power source 40 within the transmitter 20; installing the appropriate receiver power source 130 within the receiver 110, 180; activating the transmitter 20 by manipulating the transmitter ON/OFF switch 60; programming the threshold temperature setting at the transmitter 110 by manipulating the temperature set point increment switch 65 or the temperature set point decrement switch 68 of the transmitter 20; installing the transmitter 20 onto the selected pet; carrying the receiver 110, 180 upon the wearer; activating the receiver 110 by manipulating the receiver ON/OFF switch 135; manipulating the distance increase switch 162 or the distance decrease switch 163, and going about a usual routine. If the distance between the owner and the pet exceeds the pre-set distance programmed into the receiver 110, the range alarm 170 on the receiver will be activated. The range alarm 170 can only be disabled by decreasing the distance "d" 215 between the user 210 and the pet 200, or by manipulating the distance increase switch 162 on the receiver 110, 180 to a more acceptable value. If the ambient temperature in the vicinity of the transmitter 20 exceeds the programmed set point, the transmitter alarm 70 as well as the receiver temperature alarm 155 will be activated. The transmitter alarm 70 and the receiver temperature alarm 155 can only be disabled by pushing the reset switch 85 on the transmitter 20 and lowering the ambient temperature in the vicinity of the pet. This is only achievable at the location of the pet 200 and the transmitter 20 due to the severe safety implications involved and cannot be silenced or ignored solely at the receiver 110, 180.

In the event that the key fob receiver 180 is selected, the temperature set point can also be alternately programmed with the temperature increase switch 168 or temperature decrease switch 169 located on the key fob receiver housing 185.

What is claimed is:

1. A pet abandonment alert system to alert an individual that a pet has been left in a vehicle when the individual is more than a certain distance away from the pet, comprising:
 a transmitter assembly secured to a pet collar having a transmitter microprocessor receiving electrical power from a transmitter power source;
 a transmitter in electrical communication with said transmitter microprocessor;
 a temperature sensor producing temperature data and in electrical communication with said transmitter microprocessor;
 a plurality of light sources in electrical communication with said transmitter microprocessor;
 wherein said transmitter assembly further includes a transmitter housing having a transmitter attachment means for securing said transmitter assembly to said pet collar;
 wherein said light sources include at least one light-emitting diode (LED), said light sources are grouped according to wavelength of the illumination; and,
 wherein said light sources are sequentially activated as a temperature of an environment external to the pet wearing said pet collar having said transmitter assembly attached increases;
 a receiver assembly having a receiver microprocessor in electrical communication with a receiver power source, said receiver assembly further comprises:
 a key fob receiver housing;
 a receiver in electrical communication with said receiver microprocessor and in wireless communication with said transmitter;
 a display screen in electrical communication with said receiver microprocessor;
 a receiver alarm in electrical communication with said receiver microprocessor;
 wherein said display screen displays a temperature data as a graph;
 wherein said transmitter microprocessor causes said transmitter to send said temperature data to said receiver;
 wherein said receiver alarm is activated when said temperature data exceeds a temperature threshold;
 wherein said transmitter microprocessor causes each individual light source of said light sources to sequentially emit illumination at a wavelength that corresponds to a finite range of temperatures;
 a temperature set point decrement switch located on said transmitter housing and in electrical communication with said transmitter microprocessor;
 a transmitter alarm speaker located on said transmitter housing and in electrical communication with said transmitter microprocessor;
 a transmitter volume control located on said transmitter housing and in electrical communication between said transmitter alarm speaker and said transmitter microprocessor; and
 a transmitter reset switch located on said transmitter housing and in electrical communication between said transmitter alarm speaker and said transmitter microprocessor;
 wherein the transmitter reset switch is configured to shut off both the transmitter alarm and the receiver temperature alarm.

* * * * *